(12) United States Patent
Heger et al.

(10) Patent No.: US 6,624,219 B1
(45) Date of Patent: Sep. 23, 2003

(54) SURFACE ACTIVE RANDOM RADICAL (CO)POLYMER AND DISPERSION METHOD FOR USING THE SAME

(75) Inventors: Robert Heger, Heidelberg; Wolfgang Schrof, Neuleiningen; Michael Seufert, Bad Dükheim; Helmut Auweter, Limburgerhof; Walter Mächtle, Ludwigshafen; Rüdiger Iden, Dudenhofen; Dieter Horn, Heidelberg, all of (DE); Ralph Nielsen, San Jose, CA (US); Eric Carlson, Palo Alto, CA (US); Chang Han-Ting, Livermore, CA (US); Sigrid Kuebler, Santa Clara, CA (US); Petro Miroslav, San Jose, CA (US)

(73) Assignees: BASF Aktiengesellschaft, Ludwigshafen (DE); SYMYX Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/640,093

(22) Filed: Aug. 17, 2000

(51) Int. Cl.⁷ .............................. C08K 5/41; C08F 26/06
(52) U.S. Cl. ........................ 524/172; 526/259; 524/548; 8/509

(58) Field of Search ................................. 524/172, 548; 526/259; 8/509

(56) References Cited

U.S. PATENT DOCUMENTS

| | | | |
|---|---|---|---|
| 4,286,959 A | 9/1981 | Horn et al. | .................... 8/524 |
| 5,262,244 A | 11/1993 | Faust et al. | ................. 428/463 |
| 5,693,732 A | 12/1997 | Sharma et al. | ............. 526/263 |

FOREIGN PATENT DOCUMENTS

| | | |
|---|---|---|
| DE | DE 23 42 659 | 1/1975 |
| DE | 30 47 688 | 7/1982 |
| DE | 9016661 U | 4/1991 |

OTHER PUBLICATIONS

Derwent Abstract 82–61729E (abstract of DE 30 47 688; Jul. 22, 1982).

*Primary Examiner*—Kriellion A. Sanders
(74) *Attorney, Agent, or Firm*—Keil & Weinkauf

(57) ABSTRACT

The present invention relates to a set of (co)polymers, dispersion formulations, solid solutions and formulation conditions able to disperse a dye selected from the group of a monoazo dye, quinophthalone dye and an anthraquinone dye in a stable nanoparticular form in an aqueous medium.

22 Claims, No Drawings

SURFACE ACTIVE RANDOM RADICAL (CO)POLYMER AND DISPERSION METHOD FOR USING THE SAME

The present application relates to a set of novel (co) polymers, dispersion formulations, solid solutions and formulation conditions able to disperse a dye selected from the group consisting of a monoazo dye, a quinophthalone dye and an anthraquinone dye in a stable nanoparticular form (nanodispersions) in an aqueous medium.

BACKGROUND OF THE INVENTION

Disperse dyes like a dye selected from the group consisting of a monoazo dye, a quinophthalone dye and an anthraquinone dye, in an aqueous medium are used, in various continuous and batchwise dyeing methods, in two basically different forms. The dyes are usually introduced into the dye bath in the form of a fine dispersion. The fineness of subdivision of the dyes is a critical factor in their use. Subdivision corresponding to a average particle size range of from 0.1 to 5.0 µm (100–5000 nm) is achieved by mechanically comminuting the dyes, obtained from their synthesis, by conventional methods, for example in stirred ball mills or kneaders in the presence of surfactants (dispersants). The function of the surfactants added is, on the one hand, to accelerate the mechanical comminution process and, on the other hand, to maintain the state of fine subdivision of the dyes in the dye bath, which state, when achieved, is thermodynamically unstable.

Mechanical comminution methods entail expensive apparatus and high expenditure of energy, and give low space-time yields. The lower limit of average particle size achievable by mechanical comminution methods is about 0.5 µm.

The use of the disperse dyes is fundamentally different in a process described in DE-OS 2,342,659. In that process the dyes are released from a previously dyed water-insoluble polymer material, which has a lower affinity than have the (textile) materials to be dyed, and which acts as a dye depot, into the dye liquor, from which the dyes then go onto the fibers to be dyed.

As a result of short-cycle dyeing processes, the fineness of subdivision and stability of dispersed dyes in dyeing liquors in recent years had to conform with evermore stringent requirements.

However, the dye dispersions of the type described are thermodynamically unstable and tend, under dyeing conditions, in particular under high temperature dyeing conditions, to recrystallize or agglomerate so as to form coarse particles. This interferes with the dyeing process, because the dye is filtered out, and hence gives unsatisfactory, uneven dyeings.

U.S. Pat. No. 4,286,959 relates to free-flowing formulations of disperse dyes, their preparation and their use for dyeing synthetic fibers. Said formulations comprise (a) one or more disperse dyes, and
(b) one or more polymers which are soluble or colloidally soluble, both in water at a pH of from 1 to 9 and in an organic solvent, said polymers being prepared by free radical or ionic polymerization or by a poly-Menschutkin reaction,
(a) being enclosed in a matrix of (b) in the form of a solid solution in a state of molecular dispersion of extremely fine subdivision so that in an X-ray defraction pattern the dyes appear amorphous, said formulation having been prepared from a solution in said organic solvent which contains (a) and (b), with (a) being present in the solution in a state of molecular dispersion, by removing the solvent.

It is an object of the present invention to offer (co) polymers which perform better as dispersing agents for a dye selected from the group consisting of a monoazo dye, a quinophthalone dye and an anthraquinone dye in an aqueous medium than the (co)polymers described in U.S. Pat. No. 4,286,959. It is another object of the present invention to offer novel dispersion formulations for a dye selected from the group consisting of a monoazo dye, a quinophthalone dye and an anthraquinone dye in an aqueous medium with improved stability.

SUMMARY OF THE INVENTION

The present invention provides a set of novel (co) polymers, dispersion formulations and formulation conditions able to disperse a dye selected from the group consisting of a monoazo dye, a quinophthalone dye and an anthraquinone dye in a stable nanoparticular form (nanodispersions) in an aqueous medium. Stable particles are defined as particles that do not crystallize, aggregate, flocculate, or precipitate out of the aqueous medium for a period of time depending on the application.

Novel (co)polymers which are employed in said dispersion formulations are random radical (co)polymers containing 20 to 50 mol % of styrene as component A,
15 to 35 mol % of acrylic acid as component B, and
15 to 60 mol % of dimethylaminoethylmethacrylate (DMAEM) or 4-vinyl pyridine as component C.

Said novel (co)polymers are usually obtained by free radical polymerization in a conventional manner.

In another embodiment of the present invention, high throughput or combinatorial techniques may be employed to discover or optimize the novel random radical (co)polymers by parallel design and/or synthetic and screening techniques.

The novel dispersion formulations contain
one of said novel (co)polymers,
a dye selected from the group consisting of a monoazo dye, a quinophthalone dye, an anthraquinone dye,
optionally further assistants useful for dyeing processes wherein said dispersion formulations are employed,
an aqueous system.

The average particle size reported in terms of hydrodynamic radius ($r_H$) of the dispersed particles in said dispersion formulations is from 10–500 nm, preferably from 20–50 nm, more preferably from 20–30 nm. The average particle size may be characterized by light scattering measurements, especially Fiber Optic DLS measurements (FODLS), as described in detail later in the specification.

Said dispersion formulations are preferably obtained from solutions which comprise one of said novel (co)polymers, a dye selected from the group consisting of a monoazo dye, a quinophthalone dye, an anthraquinone dye, and optionally further assistants useful for dyeing processes wherein said dispersion formulations are employed. Said solutions are dried, preferably by spray drying, to obtain solid solutions. Said solid solutions are mixed with an aqueous system to obtain said dispersion formulations.

In another embodiment of the present invention, high throughput or combinatorial techniques may be employed to optimize or discover novel dispersion formulations for particular applications. Such techniques use parallel design and/or synthetic and screening techniques.

Solid solutions of said dispersion formulations, which are obtained after drying the solutions comprising one of said novel (co)polymers, a dye selected from the group consisting of a monoazo dye, a quinophthalone dye, an anthraquinone dye, and optionally further assistants useful for dyeing processes wherein said dispersion formulations are employed, are also claimed in the present invention.

Said novel dispersion formulations and solid solutions are especially useful for imprinting and dyeing paper and wall paper, for imprinting foils, transparences, paper for the reproduction of photographic pictures and graphics as well as for dyeing fibers for textiles, leather and furs and imprinting textiles, preferably by the release-paper process. Additionally, said novel dispersion formulations can be employed in inks, especially inks for ink-jets.

A further understanding of the nature and advantages of the invention herein may be realized by reference to the remaining portions of the specification.

DETAILED DESCRIPTION OF THE INVENTION

The present invention relates to a set of novel (co) polymers, novel dispersion formulations, novel solid solutions and formulation conditions able to disperse stable particles, nanodispersions, especially of a dye selected from the group consisting of a monoazo dye, a quinophthalone dye and an anthraquinone dye in an aqueous medium.

While dispersion formulations of a dye selected from the group consisting of a monoazo dye, a quinophthalone dye and an anthraquinone dye in an aqueous medium have been made previously, this work has several novel and unique features. First, the formulations use (co)polymers of novel composition from a family of random radical (co)polymers. Second, the dispersion formulations are prepared by novel formulation processes to create stable nanodispersions, especially of a dye selected from the group consisting of a monoazo dye, a quinophthalone dye and an anthraquinone dye in an aqueous medium. Third, the dispersion formulations (nanodispersions) formed by using said novel (co) polymers and said novel formulation conditions offer very small average particle sizes giving rise to improved stability. Additionally, they offer potentially higher solid content and higher substrate loading than current dispersing systems.

(Co)polymers and Preparation Thereof

The novel random radical (co)polymers comprise 20 to 50 mol % of styrene as component A, 15 to 35 mol % of acrylic acid as component B, and 15 to 60 mol % of dimethylaminoethylmethacrylate (DMAEM) or 4-vinyl pyridine as component C.

In a preferred embodiment of the present invention the novel random radical (co)polymers consisting essentially of 20 to 30 mol % of styrene as component A, 15 to 20 mol % of acrylic acid as component B, and 50 to 60 mol % of dimethylaminoethylmethacrylate or 4-vinyl pyridine as component C.

Preferably, the component C is 4-vinyl pyridine.

Said novel random radical (co)polymers are very useful as dispersing agents for preparing dispersion formulations of a dye selected from the group consisting of a monoazo dye, a quinophthalone dye, an anthraquinone dye. They are especially useful as dispersing agents of an anthraquinone dye, preferably for a dye of the following formula I:

(I)

$$\text{anthraquinone dye with } NH_2, O, OH, \text{ and } SO_2NH(CH_2)_3OC_2H_5 \text{ substituents}$$

The preparation of said random radical (co)polymers is preferably carried out in a conventional manner by free radical polymerization, in solution, in mass, in emulsion or in suspension.

In another embodiment of the present invention the novel random radical (co)polymers are discovered by parallel design and synthetic techniques.

In said parallel design and synthetic technique an array of at least 8 different random radical (co)polymers is made on a substrate at known locations thereon, wherein the (co) polymers containing 0 to 100 mol % of styrene as component A, 0 to 100 mol % of acrylic acid as component B, and 0 to 100 mol % of dimethylaminoethylmethacrylate 4-vinyl pyridine as component C, wherein at least one of said components A, B or C is different from 0 mol %.

Preferably, the component C is 4-vinyl pyridine.

Preferably, said array is made with at least 64 different (co)polymers, more preferably with at least $8^4$ different (co)polymers on a substrate at known locations thereon.

The term substrate has the following general meaning:

a material having a rigid or semi-rigid surface. Said substrate exhibits physically separate synthesis regions for different materials with, for example, dimples, wells, raised regions, edged trenches, or the like. In another embodiment said physically separate synthesis regions on said substrate are vessels suitable for holding a liquid reaction mixture. The array of (co)polymers as well as the array of dispersion formulations prepared by parallel design and synthetic techniques are obtained on a substrate of the above mentioned general meaning. The embodiment of said substrate may be different depending on the objective.

Said array of random radical (co)polymers is made by a method comprising delivering the components A, B and C, an initiator and a solvent to each synthesis region on a substrate having n physically separate synthesis regions for n different (co)polymers wherein the components A, B and C are the same in each of the synthesis regions and are offered in different amounts, varying from 0 to 100 mol %;

simultaneously reacting said components at a temperature of from 40 to 95° C., preferably from 60 to 80° C. to form n different (co)polymers, wherein n is at least 2.

In a preferred embodiment the components of said (co) polymer, component A, component B and component C, said initiator and said solvent are delivered to said synthesis regions on said substrate from a pipette or from an ink-jet dispenser. Said ink-jet dispenser is for example a pulse pressure ink-jet dispenser, a bubble-jet ink-jet dispenser or a slit jet ink-jet dispenser.

Said steps of delivering said components to each synthesis region on a substrate each comprises the following steps:

(a) identifying a reference point on said substrate;
(b) moving a dispenser of one of said components A, B or C, said initiator or said solvent in a fixed distance and direction from said reference point such that said dispenser is positioned approximately above a first synthesis region on said substrate;
(c) delivering one of said components, component A, component B, component C or said initiator or said solvent to said first synthesis region; and
(d) repeating steps (b) and (c), for each remaining component or said initiator or said solvent for each of said n synthesis regions.

The initiator used in the synthesis of said random radical (co)polymers is an initiator selected from the group consisting of AIBN (azobisisobutyronitrile), $K_2S_2O_8$ and $Na_2S_2O_8$. Preferably, AIBN is used.

Suitable solvents are selected from the group consisting of aliphatic carboxylic acids with 1 to 3 carbon atoms, their amides, their mono-$C_1$-$C_4$-alkyl amides and di-$C_1$-$C_4$ alkyl amides, aliphatic and aromatic chlorohydrocarbons, alcohols of 1 to 5 carbon atoms, for example isopropanol, ketones of 3 to 6 carbon atoms, for example acetone, aromatic hydrocarbons, N-alkylated lactams and mixtures of these. Because of their good solvent power, preferred solvents are methanol, ethanol, isopropanol, formic acid, formamide, dimethylformamide, dimethylpropionamide, N-methylpyrrolidone, methylene chloride, chloroform, 1,2-dichloroethane, chlorobenzene, toluene, xylene, acetone, methylethylketone, methylisopropylketone, methylisobutylketone and mixtures of these.

The composition and conversion in the (co)polymer synthesis is preferably checked by using $^1$H-NMR and GPC.

In one embodiment the parallel synthesis of the random radical (co)polymers was carried out under an argon environment in 1 ml glass vials. A reaction block of 96 vials is loaded robotically at room temperature with the components A, B and C, initiator and solvent. The total volume of the reaction solution is usually about 200 $\mu$l to 1000 $\mu$l, preferably about 400 $\mu$l to 800 $\mu$l, more preferably about 600 $\mu$l to 700 $\mu$l. The amount of components A, B and C (monomers) added is usually about 5 to 25 wt.-%, preferably about 5 to 15 wt.-%, more preferably 8 to 12 wt.-%. The solvent used in the preferred embodiment is dimethylformamide (DMF) and the initiator used is azobisisobutyronitrile (AIBN), in an amount of 0.5 to 4 mol %, preferably 1 to 3 mol %, more preferably 2.0 mol % to total monomer.

After loading, the reaction block was sealed and heated between 40 to 95° C., preferably between 60 and 80° C., more preferably to 70° C. under stirring from magnetic stirring bars. In an alternative embodiment, a parallel condensor is placed over the top of the reactor block so that the reactions can be run at ambient pressure. The reaction time is between 4 to 36 hours, preferably between 4 to 18 hours before it was allowed to cool to ambient temperature.

Dispersion Formulation and Formulation Process

Said random radical (co)polymers are useful dispersing agents to disperse a dye selected from the group consisting of a monoazo dye, a quinophthalone dye, and an anthraquinone dye in a stable nanoparticular form (nanodispersions) in an aqueous medium. Said random radical (co)polymers are preferably used to disperse stable particles of an anthraquinone dye, more preferably of a dye of the formula I in an aqueous medium.

Therefore, another embodiment of the present invention is a dispersion formulations containing
a (co)polymer containing from 20 to 50 mol %, preferably from 20 to 30 mol % of styrene as component A, from 15 to 35 mol %, preferably from 15 to 20 mol % of acrylic acid as component B, and from 15 to 60 mol %, preferably from 50 to 60 mol % of dimethylaminoethylmethacrylate or 4-vinyl pyridine; a preferred (co)polymer contains from 20 to 50 mol %, preferably from 20 to 30 mol % of styrene as component A, from 15 to 35 mol %, preferably from 15 to 20 mol % of acrylic acid as component B, and from 15 to 60 mol %, preferably from 50 to 60 mol % of 4-vinyl pyridine;
a dye selected from the group consisting of a monoazo dye, a quinophthalone dye, an anthraquinone dye,
optionally further assistants useful for dyeing processes wherein said dispersion formulations are employed,
an aqueous system.

Said novel dispersion formulations (nanodispersions) offer stable nanodispersions with small average particle sizes of the employed dye. Said dispersion formulations show an improved stability and they offer potentially higher solid contents and higher substrate loadings than current dispersion systems.

Said dispersion formulations usually comprise from 0.1 to 20% by weight of said (co)polymer, preferably from 0.3 to 10% by weight, more preferably from 0.5 to 5% by weight.

The amount of said dye in said dispersion formulations is usually of from 0.1 to 50% by weight, preferably of from 0.3 to 20% by weight, more preferably of from 0.5 to 5% by weight.

Preferably said dye in said dispersion formulation is an anthraquinone dye, more preferably said dye is a dye of the following formula I

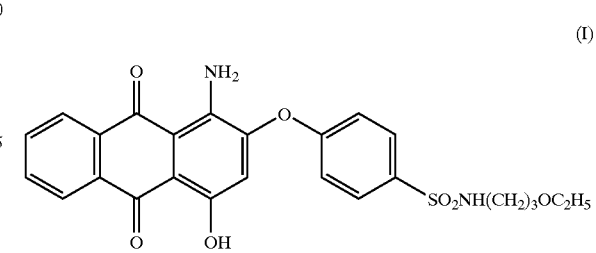

(PALANIL© Brilliantrot BEL).

An important feature to obtain dispersion formulations with improved stability wherein the particles of the dye do not crystallize, aggregate, flocculate or precipitate out of the aqueous medium, is the average particle size of the dye in said dispersion formulations. The average particle size, reported in terms of hydrodynamic radius of the dispersed particle in said dispersion formulations is therefore preferably from 10 to 500 nm, more preferably from 20 to 150 nm, most preferably from 20 to 50 nm, and especially from 20 to 30 nm. Preferably at least 50%, more preferably at least 90% of the dispersed particles are in an X-ray amorphous state.

The polydispersity index (PDI value) is preferably from 0.04 to 0.8, more preferably from 0.04 to <0.3.

The average particle sizes and PDI values were characterized by light scattering methods, preferably Fiber Optic DLS measurements (FODLS). Therefore, samples of said dispersion formulations were diluted to approximately 0.005% solids in an appropriate carrier aqueous solution. Average particle sizes and polydispersity indices (PDI values) were determined by second order cumulant analysis and are reported in terms of hydrodynamic radius ($r_H$).

In a preferred embodiment of the present invention the dispersed particles in said dyes have a average particle size, reported in terms of hydrodynamic radius ($R_H$) is from 20 to 30 nm and the polydispersity index (PDI value) is <0.3.

The dispersion formulations of a dye selected from the group consisting of a monoazo dye, a quinophthalone dye, an anthraquinone dye, preferably an anthraquinone dye, most preferably a dye of formula I, were formed by dispersing a preformed solid solution of said (co)polymers and the dye and optionally further assistants useful for dyeing processes wherein said dispersion formulations are employed in an aqueous system. Typically, the solid solutions are formed in a spray drying process, by vacuum drying or by lyophilization.

Said solid solutions are preferably obtained by spray drying, vacuum drying or by lyophilization of organic solutions which comprise one of said novel (co)polymers, a dye selected from the group consisting of a monoazo dye, a quinophthalone dye, an anthraquinone dye, and optionally further assistants in an organic solvent. Said organic solutions may be prepared directly by mixing the solutions of one of said novel (co)polymers, said dye, and optionally further assistants, or by dissolving a mixture of said random radical (co)polymer, said dye, and optionally further assistants.

If the components are dissolved separately, it is possible to use solvents which readily dissolve the individual components. Using such stock solutions, a variety of solid solutions can be prepared by mixing, followed by removal of the solvents.

The dyes may be used in the form of the moist press cake, or preferably in a dried form, for preparing the organic solutions.

The organic solution of the novel random radical (co) polymer and optionally further assistants may be obtained in a conventional manner, if necessary by heating the components in an organic solvent at up to about 150° C. If said random radical (co)polymers are obtained by solution polymerization, these polymers can be employed in the form of the solution obtained from their preparation.

Advantageously, the organic solvent or solvents is or are removed by spray drying, vacuum drying or lyophilization or in a fluidized bed dryer.

Said solid solutions which are obtained after drying said solutions contain said random radical (co)polymer, said dye selected from the group consisting of a monoazo dye, a quinophthalone dye and an anthraquinone dye and optionally further assistants useful for dyeing processes wherein said dispersion formulations are employed.

To obtain the dispersion formulations of the present invention, an aqueous system is added to said solid solution and the obtained mixture is preferably agitated to form said dispersion formulations.

The organic solvents used to obtain said solutions of said random radical (co)polymer, said dye and optionally said further assistants are selected from the group consisting of aliphatic carboxylic acids with 1 to 3 carbon atoms, their amides, their mono-$C_1$–$C_4$-alkylamides, di-$C_1$–$C_4$ alkyl amides, aliphatic and aromatic chlorohydrocarbons, alcohols of 1 to 5 carbon atoms, for example isopropanol, ketones of 3 to 6 carbon atoms, for example acetone, aromatic hydrocarbons, N-alkylated lactams and mixtures of these. Because of their good solvent power, preferred solvents are methanol, ethanol, isopropanol, formic acid, formamide, dimethylformamide, dimethylpropionamide, N-methylpyrrolidone, methylene chloride, chloroform, 1,2-dichloroethane, chlorobenzene, toluene, xylene, acetone, methylethylketone, methylisopropylketone, methylisobutylketone and mixtures of these. The most preferred solvent is dimethylformamide.

In another embodiment of the present invention the dispersion formulations are discovered by parallel design and synthetic techniques.

Another object of the present invention is therefore a method of making an array of n dispersion formulations, wherein said dispersion formulations each comprising the following components a random radical (co)polymer as described above, a dye selected from the group consisting of a monoazo dye, a quinophthalone dye, an anthraquinone dye, preferably an anthraquinone dye, most preferably a dye of the formula I, optionally further assistants useful for dyeing processes wherein said dispersion formulations are employed, an aqueous system selected from the group consisting of pure water and a buffered aqueous solution of pH 2 to 13, preferably of pH from 5 to 9, said method comprising delivering said (co)polymer and said dye and optionally said further assistants to each synthesis region on a substrate having n physically separate synthesis regions, forming n solid solutions of said (co)polymer and said dye, dispensing said aqueous system into said n physically separate synthesis regions on said substrate, and agitating the obtained mixture to form n different dispersion formulations, wherein n is at least 2 and wherein at least only one parameter selected from the group consisting of components employed, concentration of the components, temperature, reaction time, solvent is different in each of said n dispersion formulations.

In a preferred embodiment n is at least 8, more preferably n is at least 64, and most preferably n is at least $8^4$.

The substrate is defined as mentioned above and the physically separate synthesis regions on said substrate are most preferably vessels suitable for holding a liquid reaction mixture.

Said (co)polymer, said dye and optionally said further assistants are delivered to each synthesis region on a substrate having n physically separate synthesis regions in form of solutions of said (co)polymer and said dye in a solvent as mentioned above.

In a preferred embodiment of the present invention said steps of delivering the solutions of said (co)polymer and said dye and said aqueous system each synthesis region comprise the following steps:

(a) identifying a reference point on said substrate;

(b) moving a dispenser of said (co)polymer and said dye or said aqueous system, a fixed distance and direction from said reference point such that said dispenser is positioned approximately above a first synthesis region on said substrate;

(c) delivering said (co)polymer and said dye or said aqueous system to said first synthesis region; and (d) repeating steps (b) and (c), for said remaining dye and said remaining aqueous system for each of said n synthesis regions.

Preferably, said solutions of said (co)polymer and said dye are delivered to the synthesis regions on said substrate from a pipette or from an ink-jet dispenser.

In a preferred embodiment of the present invention arrays of parallel solid solutions are formed by drying solutions of the (co)polymer and the dye in glass vials to form thin films of intimately mixed solid solutions of said (co)polymer and said dye. The preferred process to form solid solutions comprises making a stock solution of both the (co)polymer and the dye in an organic solvent as mentioned above, preferably in dimethylformamide (DMF) for each dye to (co)polymer ratio of interest. The stock solutions were agitated for 2 to 10 minutes, preferably for 4 to 6 minutes, using preferably a bench-top ultrasonic mixture and appropriate amounts of each solution were dispensed into glass vials in order to provide the desired amount of total solids for 200 to 800 μl, preferably a 300 to 600 μl, more preferably a 500 μl dispersion of each formulation. Plates of vials were then placed in a parallel spin-vac dryer. They were dried for usually 2 to 14 hours, preferably for 4 to 10 hours, most preferably for 6 to 10 hours at 0 to 10 torr, preferably at 1.0 torr with mild heating (for example 40° C. for the first 15 minutes). After drying the vials are left with a film of molecular mixed (co)polymer and dye and optionally further assistants.

The dispersion formulations are made in a preferred embodiment by using a parallel pipettor to dispense 200 to 800 μl, preferably 300 to 600 μl, more preferably 500 μl of the appropriate aqueous system selected from the group consisting of pure water and a buffered aqueous solution of pH from 2 to 13, preferably of pH from 5 to 9, into the vials containing the dye/(co)polymer solid solutions. Mild agitation was provided by repeatedly aspirating and dispensing fluid from the vials. Additionally, low energy agitation was provided, preferably by using a small, bench-top ultrasonic mixer. In an alternative embodiment, additional agitation is delivered after heating the dispersions to 20 to 80° C., preferably to 40 to 60° C., more preferably to 50° C. for 10 to 100 minutes, preferably for 20 to 60 minutes and using the parallel pipettor by repeatedly aspirating and dispensing fluid from the vials.

Solid Solutions and Preparation Thereof

Another embodiment of the present invention is a solid solution containing a (co)polymer containing from 20 to 50 mol %, preferably from 20 to 30 mol % of styrene as component A, from 15 to 35 mol %, preferably from 15 to 20 mol % of acrylic acid as component B, and from 15 to 60 mol %, preferably from 50 to 60 mol % of dimethylaminoethylmethacrylate or 4-vinyl pyridine; a preferred (co) polymer contains from 20 to 50 mol %, preferably from 20 to 30 mol % of styrene as component A, from 15 to 35 mol %, preferably from 15 to 20 mol % of acrylic acid as component B, and from 15 to 60 mol %, preferably from 50 to 60 mol % of 4-vinyl pyridine;

a dye selected from the group consisting of a monoazo dye, a quinophthalone dye, an anthraquinone dye, optionally further assistants useful for dyeing processes wherein said dispersion formulations are employed.

Preferably said dye in said dispersion formulation is an anthraquinone dye, more preferably said dye is a dye of the following formula I

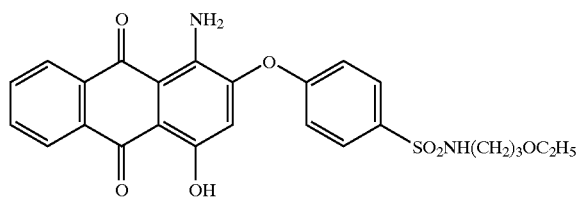

(PALANIL© Brilliantrot BEL).

Said solid solutions are preferably obtained as described above.

Screening

In a subsequent step the array of dispersion formulations mentioned above is preferably screened for a useful property. Said useful property is the ability to disperse stable particles (nanoparticles) of said dye in an aqueous medium.

The ability to disperse said dye in a stable nanoparticular form in an aqueous medium is tested by a stability testing. For this testing samples were screened for a quantity of substrate dispersed and average particle size of dispersed particles between 12 hours and 2 weeks after formation of the dispersion formulation (nanodispersion). To accelerate any aging process (Ostwald ripening, crystallization, agglomeration, flocculation, chemical attack or other destabilizing processes) samples are thermally cycled. In a preferred embodiment of the aging process, samples were heated at least twice to 50° C. for one hour and allowed to cool to ambient temperature for 4 hours. Samples were then allowed to set undisturbed for the aging process to allow unstable particles to settle on the bottom of the vials.

Another embodiment of the present invention are therefore the dispersion formulations containing a (co)polymer as defined above, a dye selected from the group consisting of a monoazo dye, a quinophthalone dye, an anthraquinone dye, optionally further assistants useful for dying processes wherein said dispersion formulations are employed, and an aqueous system, wherein said dye is dispersed in said aqueous system in a stable nanoparticular form and does essentially not crystallize, aggregate, flocculate, or precipitate out of said aqueous medium for at least 12 hours, preferably for at least two weeks.

Additionally, the dispersion characteristics of the dispersion formulations were analyzed by spectrophotometer measurements. The measurements of the samples show that samples drawn from the top and the bottom of the vials show a large absorption maximum at a wave length of approximately λ=550 nm for a dye of the formula I (PALANIL© Brilliantrot BEL) with less than 10% deviation between the measured absorption between samples drawn from the top and the bottom of the vial. In a preferred embodiment of the screening the samples are diluted to 0.05% solids in the appropriate aqueous medium.

Said novel dispersion formulations and solid solutions are especially useful for imprinting and dyeing paper and wall paper, for imprinting foils, transparences, paper for the reproduction of photographic pictures and graphics as well as for dyeing fibers for textiles, leather and furs and imprinting textiles, preferably by the release-paper process. Additionally, said novel dispersion formulations can be employed in inks, especially inks for ink-jets.

The application of said novel dispersion formulations and solid solutions in processes for imprinting and dyeing paper and wall paper, for imprinting foils, transparences, paper for the reproduction of photographic pictures and graphics as well as for dyeing fibers for textiles, leather and furs and imprinting textiles, preferably by the release-paper process is also claimed in the present invention. Additionally, said novel dispersion formulations can be employed in inks, especially inks for ink-jets.

Dyeing formulations, preferably formulations of inks for inkjets comprising a dispersion formulation or a solid solution as described in the specification and optionally conventional dyeing auxiliaries are also claimed in the present invention.

The examples which follow further illustrate the invention.

EXAMPLES

Preparation of the (Co)polymer

Example 1

A reaction vessel fitted with a reflux condenser was charged with 900 g of dimethylformamide (DMF), 20 g of styrene, 20 g of acrylic acid, 60 g of 4-vinyl pyridine and 2 g of azobisisobutyronitrile (AIBN) (Porofor N, corresponds to V60). The reaction mixture was heated in an oil bath to 70° C. under stirring. After 6 h at 70° C. the reaction mixture was cooled down to room temperature. The solids content of the obtained mixture was above 8%-wt.

Example 2

A reaction vessel fitted with a reflux condenser was charged with 550 g of DMF and 180 g of 4-vinylpyridine. The reaction mixture was heated in an oil bath to 80° C. When the temperature of the reaction mixture was constant, 60 g of styrene and 60 g of acrylic acid (dissolved in 100 g of DMF) were added in 2 h by linear addition. Additionally 6 g of Porofor N (dissolved in 50 g DMF) were added in 3 h by linear addition. The reaction mixture was polymerized for additional 3 h. A mixture with a solids content of more than 25%-wt is obtained.

Preparation of the Dispersion Formulation

Example 3

200 g of the (co)polymer solution prepared in example 1 were mixed with 200 g of a solution (4%-wt) of PALANIL© Brilliatrot BEL in dimethylformamide (DMF). The solution obtained is homogenized and subsequently spray dried (gas entry temperature 180° C., gas exit temperature 80° C.) to give 22.5 g of a red powder.

Said powder (22.5 g) was dispersed in 750 g of an aqueous solution which was basified to pH 9. A transparent deep red dispersion was obtained. The average particle size which was determined by DLS measurements was 49 nm ($r_H$).

What is claimed is:

1. Random radical (co)polymers essentially consisting of
   20 to 50 mol % of styrene as component A,
   15 to 35 mol % of acrylic acid as component B, and
   15 to 60 mol % of 4-vinyl pyridine as component C.

2. Random radical (co)polymers as claimed in claim 1, essentially consisting of
   20 to 30 mol % of styrene as component A
   15 to 20 mol % of acrylic acid as component B, and
   50 to 60 mol % of 4-vinyl pyridine as component C.

3. Dispersion formulations containing
   a random radical (co)polymers containing
   20 to 50 mol% of styrene as component A,
   15 to 35 mol% of acrylic acid as component B, and
   15 to 60 mol% of 4-vinyl pyridine as Component C,
   a dye selected from the group consisting of a monoazo dye, a quinophthalone dye and an anthraquinone dye
   optionally further assistants useful for dying processes wherein said dispersion formulations are employed,
   an aqueous system.

4. The dispersion formulation as claimed in claim 3, wherein said dispersion formulation comprises from 0.1 to 20% by weight of said (co)polymer.

5. The dispersion formulation as claimed in claim 3, wherein said dispersion formulation comprises from 0.1 to 50% by weight of said dye.

6. The dispersion formulation as claimed in claim 3, wherein said dye is an anthraquinone dye.

7. The dispersion formulation as claimed in claim 6, wherein said anthraquinone dye is a dye of the following formula I

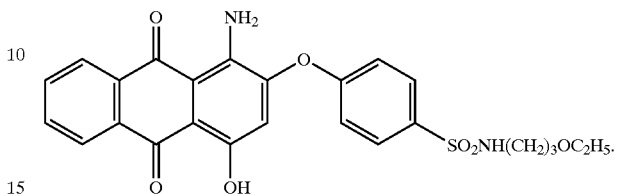

8. The dispersion formulation as claimed in claim 3 wherein the average particle size reported in terms of hydrodynamic radius of the dispersed particles in said dispersion formulations is from 10 to 500 nm.

9. The dispersion formulation as claimed in claim 3 wherein at least 50% of the dispersed particles are in an X-ray amorphous state.

10. The dispersion formulation as claimed in claim 8, wherein the polydispersity index of the dispersed particle is from 0.04 to 0.8.

11. The dispersion formulation as claimed in claim 3 wherein said dye is dispersed in said aqueous system in a stable nanoparticular form and does essentially not crystallize, aggregate, flocculate, or precipitate out of said aqueous medium for at least 12 hours.

12. Solid solutions containing
    a random radical (co)polymers containing
    20 to 50 mol% of styrene as component A,
    15 to 35 mol% of acrylic acid as component B, and
    15 to 60 mol% of 4-vinyl pyridine as component C,
    a dye selected from the group consisting of a monoazo dye, a quinophthalone dye, an anthraquinone dye,
    optionally further assistants useful for dying processes wherein said dispersion formulations are employed.

13. The solid solution as claimed in claim 12 wherein said dye is an anthraquinone dye.

14. The solid solution as claimed in claim 12 wherein said anthraquinone dye is a dye of the following formula I

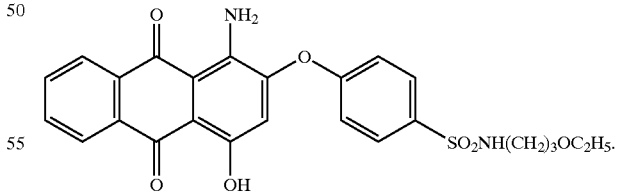

15. Dyeing formulations comprising a dispersion formulation as claimed in claim 3 and optionally conventional dyeing auxiliaries.

16. Formulations of inks for ink-jets comprising a dispersion formulation as claimed in claim 3 and optionally conventional dyeing auxiliaries.

17. Dyeing formulations comprising a solid solution as claimed in claim 12 and optionally conventional dyeing auxiliaries.

18. Formulations of inks for ink-jets comprising a solid solution as claimed in claim 12 and optionally conventional dyeing auxiliaries.

19. The dispersion formulation as claimed in claim 8 wherein the said radius is from 20 to 50 nm.

20. The dispersion formulation as claimed in claim 9 wherein at least 90% of the dispersed particles are in an X-ray amorphous state.

21. The dispersion formulation as claimed in claim 10 wherein said polydispersity index is from 0.04 to <0.3.

22. The dispersion formulation as claimed in claim 11 wherein the dye is in a stable nanoparticular form that does not crystallize, aggregate, flocculate or precipitate out of said aqueous medium for at least two weeks.

* * * * *